Oct. 6, 1931.    R. S. DAVIS    1,826,461
ROTARY ENGINE VALVE
Filed May 21, 1928    4 Sheets-Sheet 3
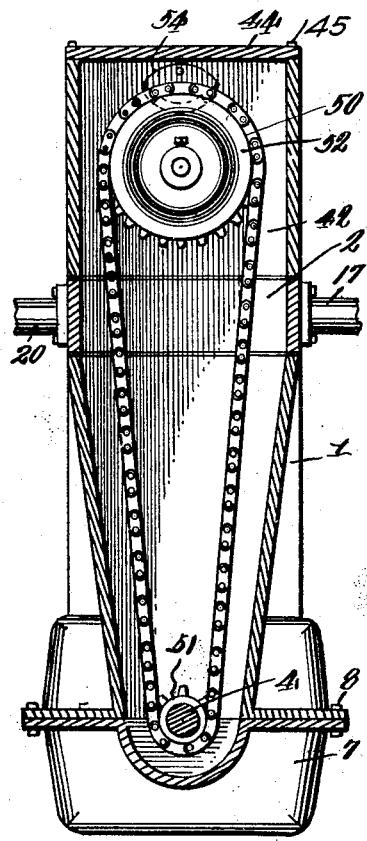
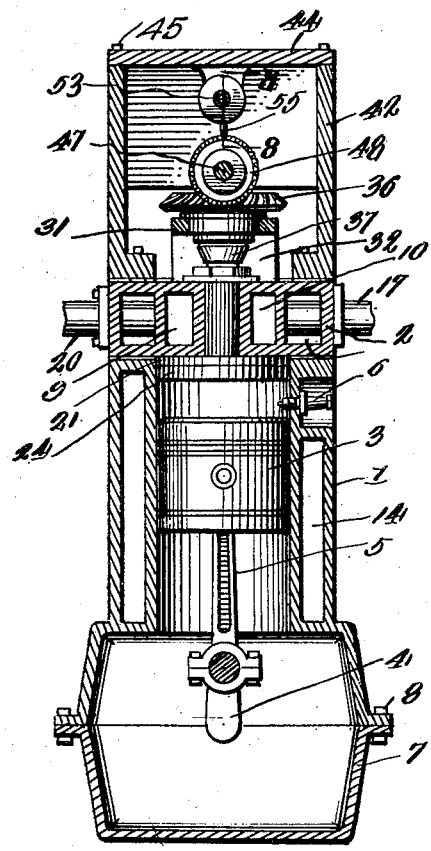
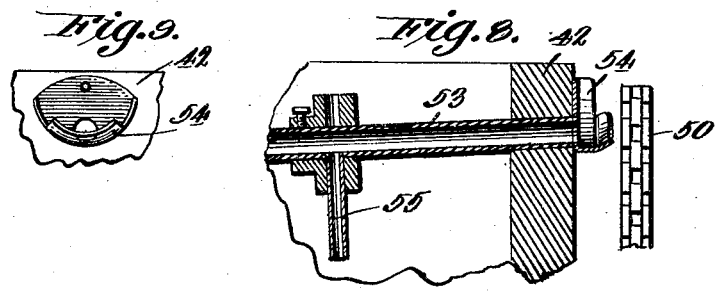
INVENTOR.
RICHARD S. DAVIS
ATTORNEYS.

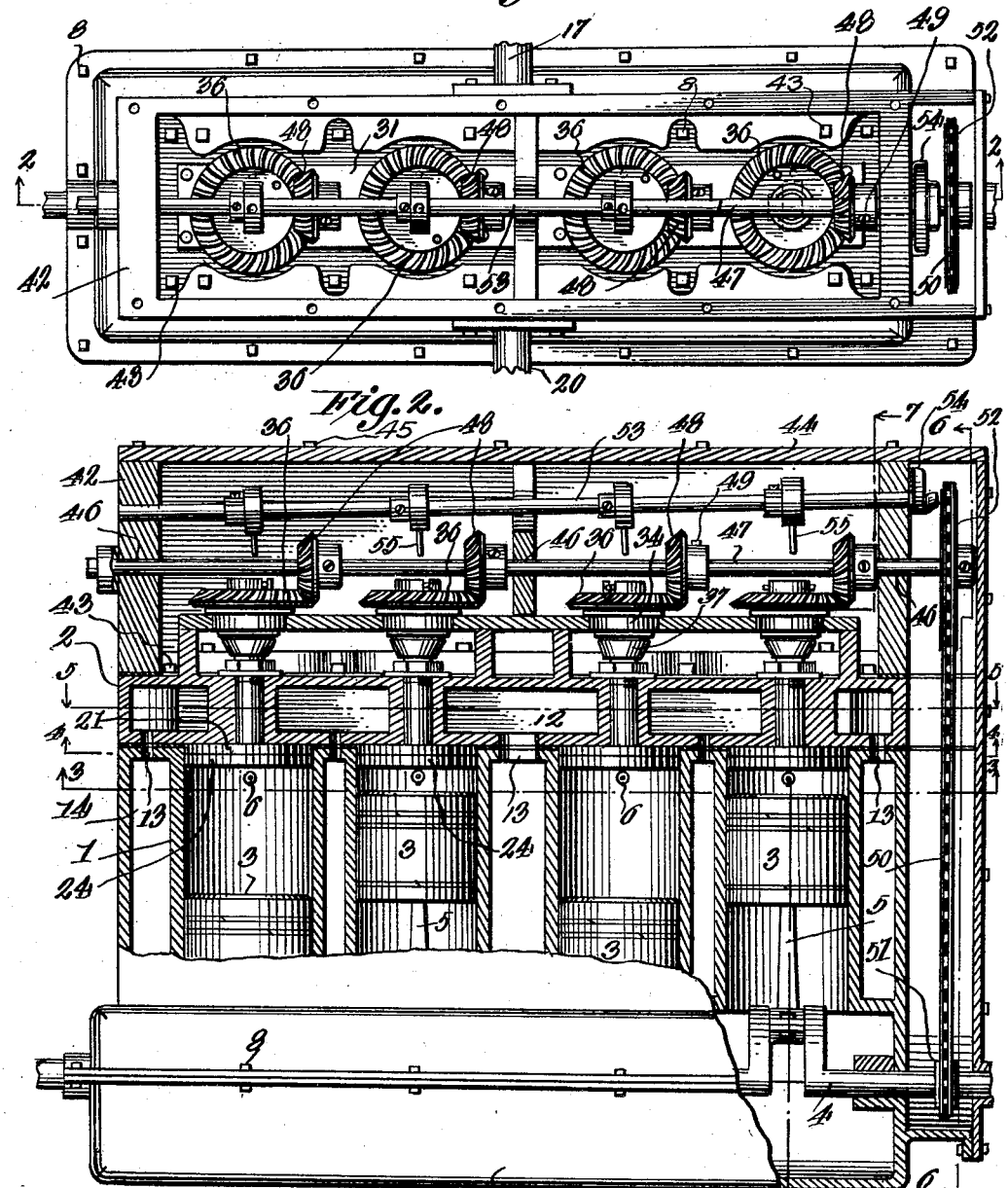

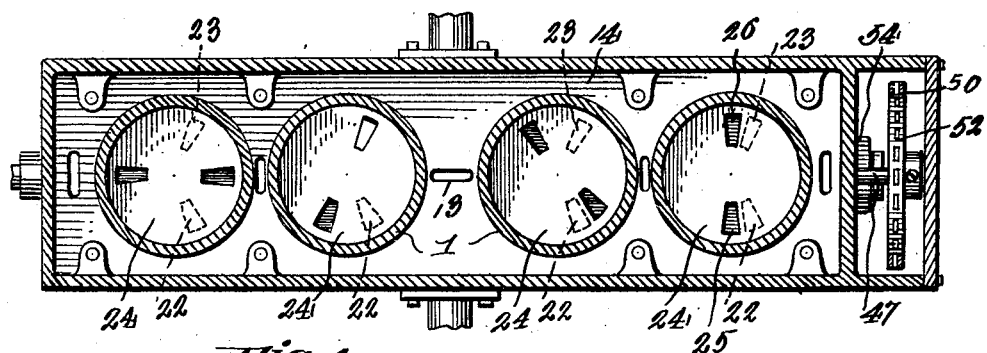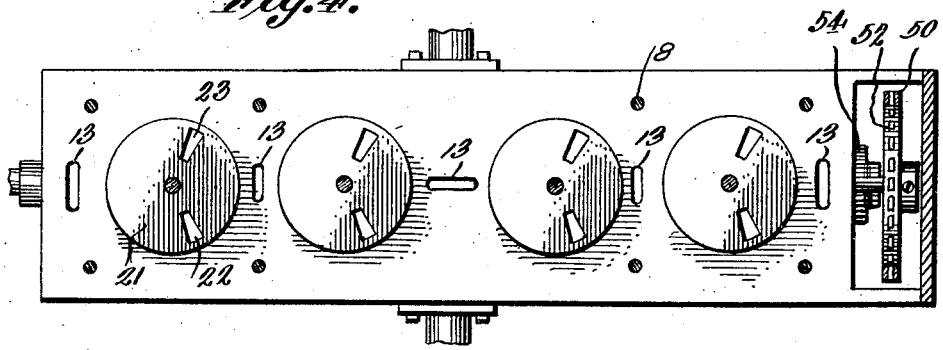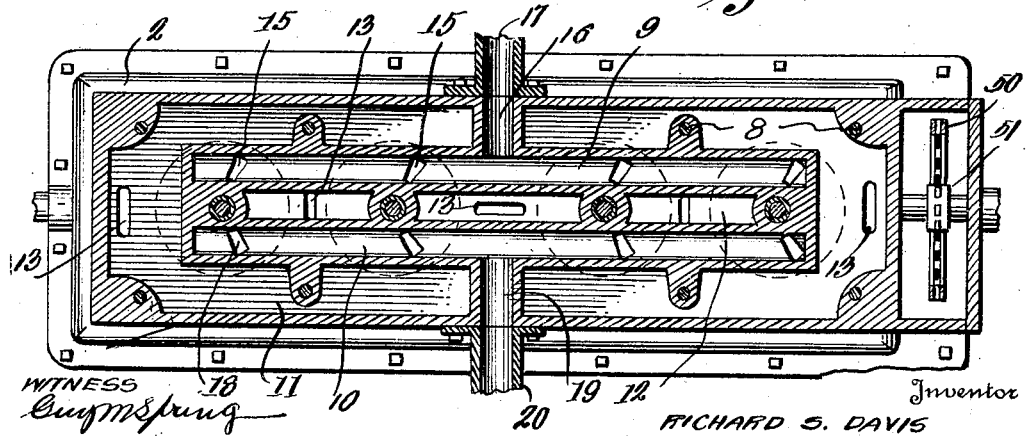

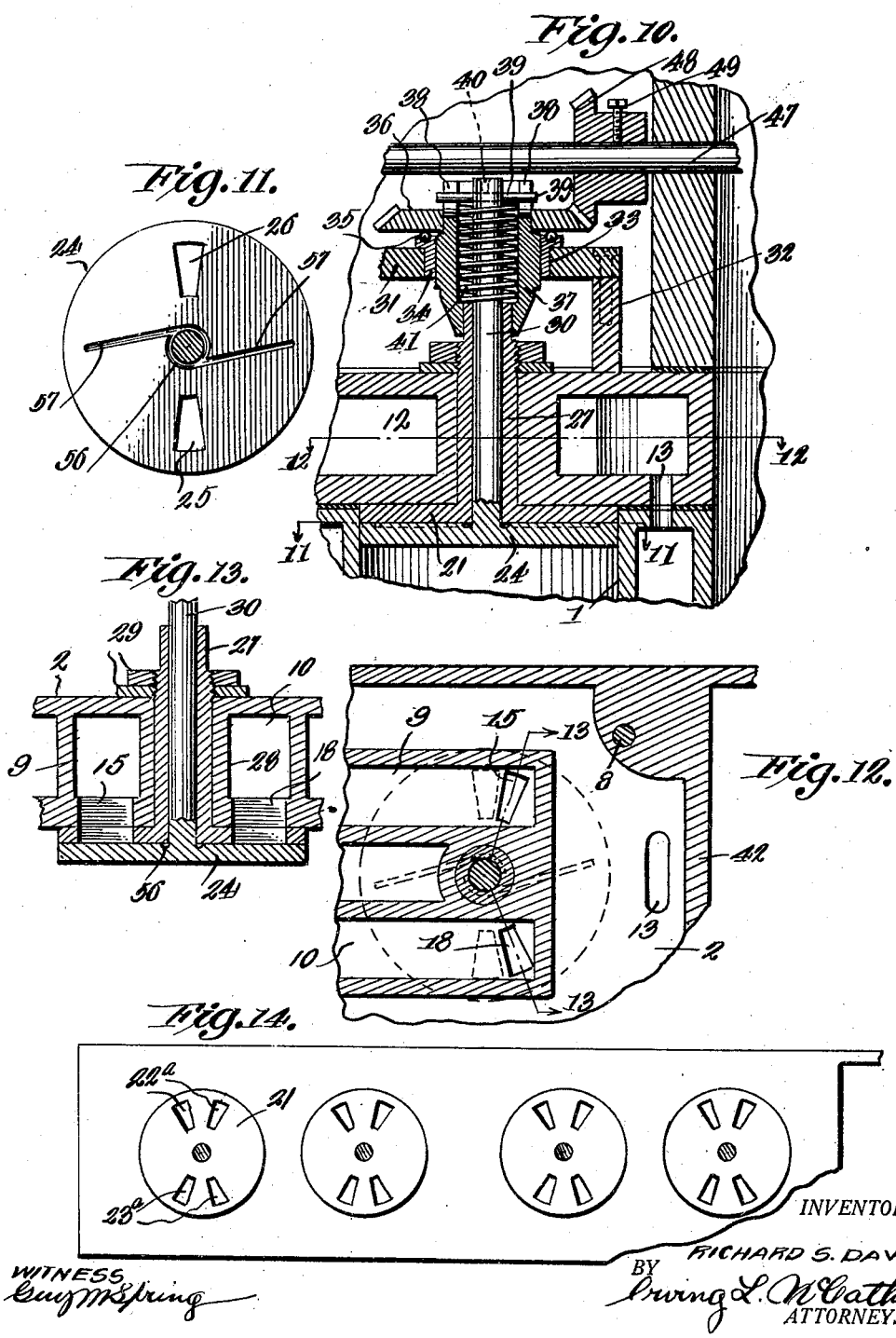

Patented Oct. 6, 1931

1,826,461

UNITED STATES PATENT OFFICE

RICHARD S. DAVIS, OF BALTIMORE, MARYLAND

ROTARY ENGINE VALVE

Application filed May 21, 1928. Serial No. 279,469.

This invention relates to internal combustion engines, and more particularly to the valve mechanisms thereof.

The present invention has for one of its objects to improve and simplify the general construction of mechanisms of this character and to provide one which will embody circular valves arranged within the upper ends of the cylinders for rotation about the vertical axis of the cylinders.

A further object of the invention is to provide a mechanism of the character stated wherein the ports of the valves and the inlet and exhaust ports of the cylinders will be so arranged as to permit the valves to be rotated at one-quarter the speed of the crank shaft.

A further object of the invention is to provide a mechanism of the character stated wherein the means for rotatably supporting the valves will embody a construction adapted to prevent any side thrust on the valves and their stems, whereby to insure the valves seating properly at all times.

A further object of the invention is to provide a mechanism of the character stated wherein the valves will be connected to their driving means by means adapted to prevent the pressure within the cylinders from interfering with the free rotation of the valves and adapted to permit the pressure to hold the valves firmly against their seats.

A further object of the invention is to provide a mechanism of the character stated which will embody removable wear plates for the valves and wherein the means for securing the wear plates in place will constitute bearings for the valve stems.

A still further object of the invention is to provide a mechanism of the character stated which will include novel means for lubricating the valves and the valve driving means.

With the foregoing and other objects in view, the nature of which will appear as the description proceeds, the invention consists in the novel construction, combination and arrangement of parts hereinafter fully described and claimed, and illustrated in the accompanying drawings, wherein:

Figure 1 is a top plan view of an internal combustion engine embodying a valve mechanism constructed in accordance with my invention, the cover for the mechanism being removed;

Figure 2 is a sectional view taken on the vertical plane indicated by the line 2—2 of Figure 1 with the cover applied;

Figure 3 is a sectional view taken on the horizontal plane indicated by the line 3—3 of Figure 2;

Figure 4 is a sectional view taken on the horizontal plane indicated by the line 4—4 of Figure 2;

Figure 5 is a sectional view taken on the horizontal plane indicated by the line 5—5 of Figure 2;

Figure 6 is a sectional view taken on the vertical planes indicated by the line 6—6 of Figure 2;

Figure 7 is a sectional view taken on the vertical planes indicated by the line 77 of Figure 2;

Figure 8 is a detail sectional view taken on the vertical plane indicated by the line 8—8 of Figure 7, illustrating the oil receiving pan and a portion of the distributing pipe of the lubricating means;

Figure 9 is a detail view in elevation of the oil receiving pan;

Figure 10 is a sectional view on an enlarged scale taken on a plane extending vertically and centrally through one of the valves and a part of the driving means therefor;

Figure 11 is a sectional view taken on the horizontal plane indicated by the line 11—11 of Figure 10;

Figure 12 is a sectional view taken on the horizontal plane indicated by the line 12—12 of Figure 10;

Figure 13 is a sectional view taken on the vertical planes indicated by the line 13—13 of Figure 12, and Figure 14 is a bottom plan view of the cylinder head illustrating a slightly modified arrangement of the intake and exhaust ports of the engine.

Referring in detail to the drawings, in the several views of which corresponding parts are designated by like reference characters, 1 designates the cylinders, 2 the cylinder head, 3 the pistons, 4 the crank shaft, 5 the connecting rods, 6 the spark plugs, and 7 the crank case of an internal combustion engine embodying my invention.

The cylinder head 2 which is secured in place by bolts 8, is provided with an intake passage 9, an exhaust passage 10 and water spaces 11 and 12. The water spaces 11 and 12 surround the passages 9 and 10 and communicate by way of openings 13 with the water jacket 14 of the engine.

The intake passage 9 and the exhaust passage 10 extend longitudinally of the cylinder head 2 in relatively spaced relation. The intake passage 9 communicates with the cylinder 1 by way of ports 15, and is provided at its transverse center with an intake port 16 which communicates with the carburetor, not shown, by way of a pipe 17. The exhaust passage 10 communicates with the cylinders 1 by way of ports 18, and is provided at its transverse center with a discharge port 19 which communicates with the exhaust pipe 20. The passage 9 constitutes the intake manifold and the passage 10 the exhaust manifold of the engine, and the ports 17 and 18 are arranged at and communicate with the upper ends of the cylinder 1.

Circular wear plates 21 are secured against the under side of the cylinder head 2 within the upper ends of the cylinders 1, and are provided with ports 22 registering with the intake ports 15 and with ports 23 registering with the discharge ports 18. Circular valves 24 are rotatably supported within the upper ends of the cylinders 1 against the under sides of the wear plates 21, and are provided with ports 25 and 26 which, during the rotation of the valves, pass into and out of registration with the ports 22 and 23. The wear plates 21 are carried by sleeves 27 which extend upwardly through bosses 28 arranged within the cylinder head 2 between the passages 9 and 10, and they are secured in place by nuts 29 engaging the sleeves and resting upon the bosses. The stems 30 of the valves 24 are rotatably arranged within the sleeves 27 and extend above the same.

A bar 31 extending longitudinally of the cylinder 2 and supported therefrom by blocks 32, is provided with openings 33 through which the upper ends of the valve stems 30 extend. Bushings 34 are fixed in the openings 33, and are provided at their upper ends with ball bearings 35. Spiral gears 36 rest upon the bearings 35, and their hubs 37 pass through the bushings 34 and receive the upper ends of the sleeves 27. The hubs 37 extend above the gears 36, and are provided in their upper ends with diametrically opposed notches 38. Pins 39 extending diametrically through the upper ends of the valve stems 30 and secured in place by screws 40, have their ends arranged in the notches 38 to establish a driving connection between the valve stems and the gears 36. The notches 38 are deeper and wider than the diameter of the pins 39 so as to permit the gears 36 to move, during the starting of the motor, with respect to the pins 39 and thus prevent the placing of undue strain upon the pins. The valves 24 are yieldingly maintained against their wear plates or seats 21 by spiral springs 41 which are arranged within the hubs 37 about the valve stems 30 and between the sleeves 27 and the pins 39. As the valves are yieldingly supported against their seats 21 the pressure in the cylinders 1 will hold them seated firmly at all times. The yielding supports of the valves 24, together with the depth of the notches as compared with the diameter of the pins 39, permits the expansion and contraction of the valves and associated parts without strain being placed upon the connections between the valves and the gears 36. Furthermore, the manner in which the valves 24 are mounted and connected to the gears 36 prevents side thrusts of the valves and their stems 30.

A housing 42 is mounted upon the cylinder head 2, and is secured thereto by screws 43. The housing 42 is provided with a removable top plate 44 which is secured in place by bolts 45, and it is provided with bearings 46 which are arranged in alignment with the longitudinal center of the engine. A shaft 47 is journaled in the bearings 46, and secured thereto are spiral pinions 48 which mesh with the gears 36. The pinions 48 are secured to the shaft 47 by set screws 49 in order to permit them to the adjusted angularly thereon when timing the valve mechanism. The shaft 47 is driven directly from the crank shafts by a sprocket chain 50 which passes about a sprocket wheel 51 fixed to the crank shaft and a sprocket wheel 52 fixed to the valve shaft 47. The gears 36, pinions 48 and sprocket wheels 51 and 52 are of such size relatively as to rotate the valves 24 at one-fourth the speed of the crank shaft 4. Any wear in the gears 36 and pinions 48, or in the sprocket wheels 51 and 52, may be compensated for by adjusting the sprocket chain 50. If desired, spur gears and pinions may be substituted for the spiral gears 36 and pinions 48.

A tube 53 is supported above the valve shaft 47, and occupies a downwardly and rearwardly inclined position. A pan 54 is secured to the front end of the tube 53 in a position to catch the oil as it is thrown from the upper portion of the sprocket chain 50, the chain picking up the oil as it travels through the crank case 7. The oil flows from the pan 54 into the tube 53, and it discharges from the tube through nozzles 55 which are arranged in axial alignment with the hubs 37. The oil passes over and lubricates the gears 36 and pinions 48, and it flows down the length of the valve stems 30 into annular grooves 56 formed in the upper sides of the valves 24. Grooves 57 formed in the upper sides of the valves 24 and extending outwardly from the grooves 56 serve to evenly distribute the oil over the contacting surfaces of the valves and their seats.

It should be apparent from the foregoing description, taken in connection with the accompanying drawings, that the valves 24 will operate and close the intake ports 22 and the exhaust ports 23, that they will at all times be held firmly against their seats, and that the pressure within the cylinders will not interfere with their rotation. It should also be apparent that the valves and the driving means therefor are effectively lubricated, and that the valves may be readily timed and will not get out of timed relation. The timed relation of the valves is such that the firing order of the cylinders is one-three-four-two. It will be further apparent that by removing the cover plate 44 free access may be had to the valve driving means and the means by which the valves are connected with the driving means, that by removing the cylinder head 2 and the cover plate free access may be had to the valves, and that if desired the valve seats 21 may each be provided with a pair of intake ports 22ª and a pair of exhaust ports 23ª, as shown in Figure 14, these ports communicating with corresponding ports formed in the bottom of the cylinder head 2, and communicating with the passages 9 and 10.

While I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what I claim is:

1. An engine comprising a cylinder head having intake and exhaust passages extending longitudinally thereof and provided with water spaces surrounding the passages, the head being provided in its sides with ports communicating with said water spaces, and in its bottom with ports communicating with said passages, valves seating against the bottom of the head, and means for rotating the valves.

2. An engine comprising a cylinder, a wear plate, a flat circular rotary valve adapted to rotate on said wear plate, a stem carried by said valve, a guide for said stem, an enlarged hub carried by said guide, a spring mounted within said hub, drive means carried by said hub, said hub provided with an enlarged socket for receiving said spring, the side walls of said socket in said hub being spaced from said valve stem to relieve lateral strain therefrom, and means carried by said stem for locking the same in engagement with said hub for rotary movement therewith.

3. An engine of the class described comprising a cylinder, a cylinder head, a rotary disc-like valve mounted therein, a wear plate interposed between the valve and cylinder head, said wear plate provided with a guiding sleeve, said valve provided with a stem extending through said sleeve, an enlarged hub carried by said sleeve and provided with an enlarged socket extending longitudinally thereof, said hub provided with aligned notches at the top thereof, a pin carried by said valve stem and fitting into said notches, drive means carried by said hub, a spring mounted within said hub and urging said stem upwardly, said hub being spaced from said stem and relieving lateral strain therefrom.

In testimony whereof I affix my signature.

RICHARD S. DAVIS.